(12) United States Patent
Finlan

(10) Patent No.: US 9,370,169 B2
(45) Date of Patent: Jun. 21, 2016

(54) ANIMAL LEAD

(76) Inventor: John Finlan, Bowdon (GB)

( * ) Notice: Subject to any disclaimer, the term of this patent is extended or adjusted under 35 U.S.C. 154(b) by 247 days.

(21) Appl. No.: 14/112,339

(22) PCT Filed: Apr. 18, 2012

(86) PCT No.: PCT/GB2012/000352
§ 371 (c)(1),
(2), (4) Date: Oct. 17, 2013

(87) PCT Pub. No.: WO2012/143670
PCT Pub. Date: Oct. 26, 2012

(65) Prior Publication Data
US 2014/0216360 A1    Aug. 7, 2014

(30) Foreign Application Priority Data
Apr. 21, 2011 (GB) .................................. 1106895.4

(51) Int. Cl.
*A01K 27/00* (2006.01)
*F16B 45/02* (2006.01)

(52) U.S. Cl.
CPC .............. *A01K 27/005* (2013.01); *A01K 27/003* (2013.01); *F16B 45/02* (2013.01); *Y10T 24/45361* (2015.01); *Y10T 24/45372* (2015.01)

(58) Field of Classification Search
CPC . A01K 27/005; F16B 45/02; Y10T 24/45361; Y10T 24/45372
See application file for complete search history.

(56) References Cited

U.S. PATENT DOCUMENTS 1,061,435 A * 5/1913 Witt ........................ F16B 45/02
24/599.1
1,271,647 A * 7/1918 Young ..................... F16B 45/02
24/598.2
(Continued)

FOREIGN PATENT DOCUMENTS

DE    232 052    3/1911
DE    234 962    5/1911
(Continued)

OTHER PUBLICATIONS
International Application No. PCT/GB2012/000352 Search Report dated Jul. 11, 2012.
(Continued)

*Primary Examiner* — Monica Williams
*Assistant Examiner* — Magdalena Topolski
(74) *Attorney, Agent, or Firm* — Woodard, Emhardt, Moriarty, McNett & Henry LLP

(57) ABSTRACT

An animal lead is arranged for gripping by a handler at one end, and has a releasable attachment means for a collar or harness at the other end. The attachment means has a hooked body (4) with an aperture (20) closed by a gate (7) in a release frame (5). The release frame moves relative to the body and has an open configuration in which the gate is retracted from the gap, and a closed configuration in which the gate is held by the release frame to close the gap. The gate moves relative to the release frame whereby the hooked body may be clipped into a fastening loop of a collar or harness by the gate pushed aside and springing back to close the gap. The release frame has a decoupling member (10) arranged to sweep across the aperture as the release frame is moved from the closed to the open configuration, so that the decoupling member urges the collar to disengage by sweeping a rim of its fastening loop out of the aperture through the gap. The attachment means may have a releasable locking arrangement (11, 14) for the release frame and a remote actuating means for operation of the release frame. The arrangement allows for convenient attachment/detachment of an animal to the lead.

17 Claims, 1 Drawing Sheet

(56) References Cited

U.S. PATENT DOCUMENTS

| | | | | |
|---|---|---|---|---|
| 1,390,129 | A | * | 9/1921 | Hesse ............... F16B 45/02 24/599.6 |
| 2,492,991 | A | * | 1/1950 | Hanna ............... F16B 45/02 24/599.6 |
| 6,718,601 | B1 | * | 4/2004 | Choate ............... F16B 45/02 24/599.5 |
| 2008/0022498 | A1 | * | 1/2008 | Griffith ............... F16B 45/02 24/598.7 |
| 2008/0104809 | A1 | * | 5/2008 | Lin ............... F16B 45/02 24/600.1 |
| 2013/0025095 | A1 | * | 1/2013 | Yang ............... F16B 45/02 24/599.5 |
| 2015/0069206 | A1 | * | 3/2015 | Sakuma ............... A47G 25/0607 248/552 |

FOREIGN PATENT DOCUMENTS

| | | |
|---|---|---|
| EP | 0644340 | 3/1995 |
| GB | 15604 | 0/1902 |
| GB | 616729 | 1/1949 |
| GB | 784166 | 10/1957 |
| GB | 1186066 | 4/1970 |
| WO | WO 02/01943 | 1/2002 |
| WO | WO 2006/076769 | 7/2006 |
| WO | WO 2007/114754 | 10/2007 |

OTHER PUBLICATIONS

United Kingdom Application No. GB1106895.4 Search Report dated Aug. 19, 2011.

* cited by examiner ns have
ANIMAL LEAD

FIELD

The present invention is concerned with leads (also known as leashes) for domestic animals such as pets, particularly for dogs, and in particular for leads where the lead is disengageable from a harness or collar on the animal. In particular, it is concerned with a lead that can be rapidly attached in order to bring a domestic animal rapidly under control, and also rapidly and easily released to allow the animal to be unleashed.

BACKGROUND TO THE INVENTION

Lead structures, collars, harnesses and the like are available in various designs intended to control domesticated animals. A common arrangement, particularly for use with dogs, is the use of a collar fastened around the neck of an animal, with the collar attached to a lead. The person controlling the animal grasps a handle at the proximal end of the lead and the distal end of the lead is attached to the collar.

With such a collar arrangement, it is desirable that the lead is easily attachable to the collar and can be removed, for instance, to allow the animal to roam freely.

Domestic animals, such as dogs, may need to be brought under control rapidly depending upon the prevailing circumstances. In such a situation, to protect the safety of the dog or the safety of others, it may be necessary to rapidly attach a lead to a dog already wearing a collar, or it may be necessary to attach a collar to the dog rapidly so that a lead can subsequently be attached to bring the dog under control.

Typical prior art collars, particularly dog collars, have used conventional buckle and strap arrangements, with a pin-buckle adjustable on a strap with poles through which the pin passes. Other known arrangements use, for instance, Velcro™ straps in order to provide adjustment of the collar. Another known arrangement uses a toothed belt and ratchet combination where the collar is fastened by inserting the distal end of a toothed belt into a slider having a ratchet, and the belt is tightened by pushing the toothed belt into the slider with the ratchet grasping the toothed belt.

The usual manner for attachment of a lead to a collar is the use of a fastening loop, enclosed by a rim, attached to the collar interlocked with a hooked clip provided at the distal end of the lead. To attach the lead to the collar, the hooked clip is engaged with the fastening loop by hooking the loop so that the loop enters an aperture defined by the hooked clip through an opening. The opening is then closed, by some gate means, to prevent the fastening loop inadvertently disengaging from the hooked clip. The fastening loop may have a rim of flexible plastic or cord attached to a collar or harness, but is typically a metal ring or D-ring, with the ring forming the rim of the loop, attached to a collar or harness.

By "hooked clip" is meant an attachment means in the form of an arcuate body enclosing an opening or aperture with a gap in the arcuate body through which a fastening loop can pass so that the fastening loop may interlock with the arcuate body. The gap will be between opposed terminals of the arcuate body, at least one of which is positioned to provide a hook shape to facilitate interengagement of the arcuate body and the rim of the fastening loop. The gap is typically closable by a sprung gate, which may by pushed open by the rim of the fastening loop to permit entry of the fastening loop through the gap as the hook is clipped onto the loop. In another embodiment, a screw fastener may be used to close the gap once the fastening loop and arcuate body are interengaged.

Typical hooked clips used for animal leads include spring clips such as karabiner arrangements which have a sprung side arm or gate which closes the hook aperture after the hooked clip has been attached to the collar. Maillon type arrangements or shackles may also be used where the clip is openable by means of a screw arrangement or, for instance, slide clips where a section of the clip is slidably removable to allow a gap to be formed through which a D-ring can pass in order to engage with a clip. All of these arrangements require some degree of manipulation when disengaging hooked clip from the fastening loop on the collar, and this may be difficult to achieve when the lead is held under tension, for instance by an animal straining on the lead.

A problem with prior art arrangements as set out above is that in order to release the animal from the lead, manipulation of the hooked clip is necessary in order to disengage the hooked clip from the fastening loop in order to open any gate arrangement and to detach the fastening loop from within the aperture of the hooked clip so that the animal is released or unleashed. This may be particularly difficult to achieve when the animal is struggling or when the animal is straining to be unleashed, so that the lead, fastening loop and hooked clip are held under tension, so that the hooked clip will have to be urged against the tension of the straining animal in order to remove or disengage the rim of the fastening loop from the hooked clip, possibly whilst also holding open the gate arrangement of the hooked clip to permit the fastening loop to be disengaged. This may be of particular importance for leads for working animals such as flock-control dogs, guard dogs and police dogs, where the dog may be straining to be released to do its job, and where the delay resulting from the manipulation required to permit release could be inconvenient or dangerous. For instance, delay in releasing a guard dog or a police dog could give time for an assailant to assault the dog handler.

Hence, there is a need for a collar arrangement and for collar and lead assemblies which overcome or address at least some of the problems set out above.

SUMMARY OF THE INVENTION

One object of the invention, amongst others, is to provide a lead for an animal which is adapted to permit easy and rapid attachment of a lead to a collar or harness, so that the animal can be brought under control rapidly, and where the lead is readily and rapidly detachable from the collar or harness by a handler, even when the animal is straining against the lead so that the lead is under tension. It is also desirable for inadvertent release of the animal from the lead to be avoided.

Hence, a first aspect of the invention provides an animal lead comprising an elongate flexible member arranged for gripping by a handler at a proximal end, and comprising an attachment means for releasable attachment to a collar or harness at a distal end, wherein the attachment means comprises:

a hooked body defining an aperture partially enclosed by the hooked body, the aperture having a gap between first and second terminals of the hooked body closable by a gate, and a release frame to which the gate is operably mounted, the release frame mounted to the hooked body for relative movement thereto and having an open configuration in which the gate is retracted from the gap with the release frame to leave the gap open and a closed configuration in which the gate is held in a first position, by the release frame, to close the gap with a proximal end of the gate at the first terminal of the hooked body and a distal end of the gate at the second terminal of the hooked body, wherein the attachment means comprises a retaining means for holding the release frame in the closed configuration, and wherein the gate is urgeable, relative to the release frame, when held in its closed configuration, towards a second position, wherein in the second position, the distal end of the gate is positioned away from the second terminal of the arcuate member and into the aperture towards the hooked body whereby the second terminal of the hooked body may be clipped into a fastening loop of a collar or harness and whereby the hooked body is retainable in said fastening loop by the gate being released to its first position to close the gap, the release frame further comprising a decoupling member arranged to sweep across the aperture as the release frame is moved from the closed to the open configuration, whereby the decoupling member urges said fastening loop to disengage from the aperture by sweeping a rim of said fastening loop out of the aperture past the second terminal through the gap.

A second aspect of the invention is a method for retaining and unleashing an animal, such as a dog, by means of a lead according to the first aspect of the invention.

A third aspect of the invention is the use of a lead according to the first aspect of the invention for holding and releasing an animal, such as a dog.

DETAILED DESCRIPTION OF THE INVENTION

Throughout this specification, the term "comprising" or "comprises" means including the component(s) specified but not to the exclusion of the presence of others. The term "consisting essentially of" or "consists essentially of" means including the components specified but excluding other components except for materials present as impurities, unavoidable materials present as a result of processes used to provide the components, and components added for a purpose other than achieving the technical effect of the invention. Whenever appropriate, the use of the term "comprises" or "comprising" may also be taken to include the meaning "consists essentially of" or "consisting essentially of".

The optional and/or preferred features set out may be used either individually or in combination with each other where appropriate and particularly in the combinations as set out in the accompanying claims. The optional and/or preferred features for each aspect of the invention set out above are also applicable to any other aspects of the invention, where appropriate.

The first aspect of the invention provides an animal lead comprising an elongate flexible member arranged for gripping by a handler at a proximal end, and comprising an attachment means for releasable attachment to a collar or harness at a distal end.

The elongate flexible member may be of any suitable material such as textile, polymer (e.g. nylon, Kevlar™, natural or synthetic rubber, neoprene, etc.), leather or the like. It may be in the form of a strap or a rope or cord. The strap or cord may be reinforced with fibres such as carbon fibre or may include metal reinforcement or the like.

At the proximal end, the lead may be provided with a handle in order to assist gripping by a handler, for instance the elongate flexible member may be formed into a loop at the proximal end for gripping by a handler. In another embodiment, a retracting handle may be provided, having a mechanism whereby the elongate flexible member may be retracted or paid out at the discretion of the handler. Such handles for varying the length of a lead are well known in the art.

The attachment means comprises a hooked body defining an aperture partially enclosed by the hooked body, the aperture being entered through a gap between first and second terminals of the hooked body. The aperture is closable by a gate arrangeable to extend between the first and second terminals to close the gap. In use, the hooked body will have its second terminal hooked into a fastening loop, such as a ring or D-ring of a collar or harness, so that the loop passes through the aperture, interlocking with the hooked body and held within the aperture of the hooked body by the gate across the gap between the first and second terminals.

The attachment means also has a release frame to which the gate is operably mounted.

The release frame is mounted to the hooked body for relative movement relative to the hooked body. As the release frame is moved relative to the hooked body, the gate, attached to the release frame, will move with it. The release frame is moveable between an open configuration and a closed configuration. In the open configuration, the gate, moving with the release frame to which it is operably attached, is retracted from the gap to leave the gap open. The attachment means comprises a retaining means, such as a sprung latch or biasing means, for holding the release frame in the closed configuration. In the closed configuration, the gate is held in a first position, by the release frame, to close the gap with a proximal end of the gate at the first terminal of the hooked body and a distal end of the gate at the second terminal of the hooked body. However, the gate is also moveable or urgeable relative to the release frame, and may be urged from this first position, closing the gap, towards a second position, wherein in the second position, the distal end of the gate is positioned away from the second terminal of the hooked body, and into the aperture towards the hooked body. This allows the second terminal of the hooked body to be clipped into a fastening loop of a collar or harness. The hooked body is holdable within the fastening loop by the gate being released to its first position to close the gap across the terminals.

The release frame further comprises a decoupling member arranged to sweep across the aperture as the release frame is moved from its closed to its open configuration, whereby the decoupling member urges the fastening loop to disengage from the hooked body by sweeping the rim of the fastening loop of the collar or harness out of the aperture, past the second terminal and through the gap. The decoupling member will typically be a curved arm forming part of the release frame and arranged to have its distal end at the second terminal when the release frame is in the open configuration.

Suitably, the gate is pivotally mounted to the release frame at its proximal end to be pivotable between the first and second positions, with the gate biased towards the first position by a biasing means. Typically, the gate will be mounted on an axle on the release frame, with a biasing means such as a spring urging the gate towards the first position. A ramming means or a stop on the gate and/or release frame may hold the gate in the first position and allow it to be moved, against the force applied by the biasing means, towards the second position. When the release frame is in the closed configuration, the urging of the gate may be achieved by pushing or clipping the distal end of the gate against a rim of a fastening loop, such as a rigid ring or D-ring of a collar or harness, so that the gate opens inwards towards the aperture sufficiently to allow the rim of the fastening loop to slip into the aperture of the hooked body through the gap, past the gate and second terminal of the hooked body, to be interlocked with the hooked body and held within the aperture. Once the ring is inside the aperture, the gate, now urged back to the first position by the biasing means to close the gap, prevents egress of the rim of the fastening loop through the gap past the gate.

The retaining means for the release frame may be a clip or latch arrangement to hold the release frame in the closed configuration relative to the hooked body. For instance, a sprung latch may be used as retaining means. In one embodiment, the release frame is suitably pivotably mounted to the hooked body to be pivotable between the open configuration and the closed configuration and the holding means is a second biasing means arranged to bias the release frame towards the closed configuration. Typically, the release frame will be mounted to pivot about an axle affixed to the hooked body towards the distal end of the hooked body.

Typically, the release frame and gate will be arranged to pivot in the same plane, so in other words, the axles about which they are arranged to pivot will have substantially parallel axes. These axes will be typically substantially normal to a plane formed by the hook of the hooked body. Preferably, the hooked body will be hollow whereby the release frame, in its closed configuration, is substantially concealed within the interior of the hooked body.

The attachment means may comprise a releasable locking arrangement having a locked configuration in which the release frame is held in the closed configuration and an unlocked configuration in which the release frame is movable between the closed and open configurations. Any suitable locking arrangement may be employed, such as a latch means, a locking pin or the like. In other words, the release frame may be lockable in the closed configuration so that it has a locked configuration in which the release frame cannot move relative to the hooked body. The releasable locking arrangement may also be the retaining means for the release frame, but preferably, the retaining means and locking arrangement are separate. Even in this locked configuration, it may still be possible to release the hooked body from a fastening loop, but it would be necessary to manipulate the gate manually from the first to the second configuration and to unhook the second terminal of the hooked body from the fastening loop. In the locked configuration, the release frame cannot be moved to its open configuration and so any disengagement must be by manipulation of the gate in the manner known for prior art hooked clips. However, whilst in this locked configuration, the hooked body may still be easily clipped onto a fastening loop by pressing the rim of the fastening loop against the gate to urge the gate open sufficiently to permit the fastening loop rim to pass into the aperture to interlock with the hooked body, the gate closing behind it to hold the fastening loop in place.

A suitable locking arrangement may comprise a locking pin arranged to pass through openings in the release frame and hooked body, in the locked configuration, to hold the release frame locked in the closed configuration. The locking pin is removable to provide the unlocked configuration. The locking pin may be shaped to hold the pin in place within the openings until the pin is subjected to a sufficient withdrawal force for disengagement. For instance, the pin may be a split pin: such split pins are well known. The pin may have a head arranged for gripping to assist in its withdrawal by a handler, and may be provided with a lanyard to attach it to the lead in order to avoid inadvertent loss.

The lead may further comprise a first actuating means arranged to move the release frame from the closed to the open configuration when actuated. In a simple arrangement, the release frame may have a handle, ring or loop which the handler grasps and pulls to move the release frame from its closed to its open configuration in order to effect the rapid disengagement of the hooked body from a fastening loop of a collar or harness.

However, a remotely operable first actuating means (for instance actuated from the proximal end of the lead) may be used in order to avoid the need for the handler to directly manipulate the attachment means near the head of an animal (hence reducing risk of biting of the handler by the animal). Hence, the first actuating means may comprise a lanyard operably connected to the release frame at the distal end of the lead and to a first trigger at the proximal end of the lead, whereby pulling the trigger moves the release frame from its closed to its open configuration, enabling remote unleashing of the animal even with the lead under tension (provided that any locking arrangement has first been arranged into its unlocked configuration). In other words, the lead may comprise a first actuating means arranged to move the release frame from its closed to its open configuration by means of a first trigger located at the proximal end of the lead. Similarly, the locking arrangement may be provided with a second actuating means operable to disengage the locking arrangement into its unlocked configuration by means of a second trigger located at the proximal end of the lead. In other words, the second actuating means unlocks the attachment means and the first actuating means may then be used to unleash an animal remotely.

Preferably, the attachment means is connected to the elongate member at a swivel joint arranged to allow rotation of the attachment means about the long axis of the elongate flexible member. This long axis is the axis along the length of the elongate flexible member when it is fully straightened under tension. The swivel joint prevents twisting and tangling of the lead. Preferably, the swivel joint is a universal joint. By "universal joint" it is meant that the joint between the attachment means and the elongate flexible member is arranged to permit substantially unencumbered movement of the attachment means relative to the lead, about the universal joint, over a solid angle of at least 2×Pi steradians. One suitable arrangement for a swivel joint or universal joint is a ball and socket joint, where the distal end of the lead is attached to a socket holding a ball able to rotate therein, the ball attached to the hooked body by a connection arm. The socket may be shaped to hold the ball whilst permitting substantial movement of the arm relative to the socket and also permitting rotation about the long axis of the arm. In another suitable arrangement, a swivel joint may be located between a handle at the proximal end of the lead and the elongate member, rather than, or in addition to, a swivel joint at between the attachment means and the elongate member of the lead.

A specific first embodiment of the present invention will now be described, by way of example only, with reference to the accompanying drawings in which.

Figure 1:
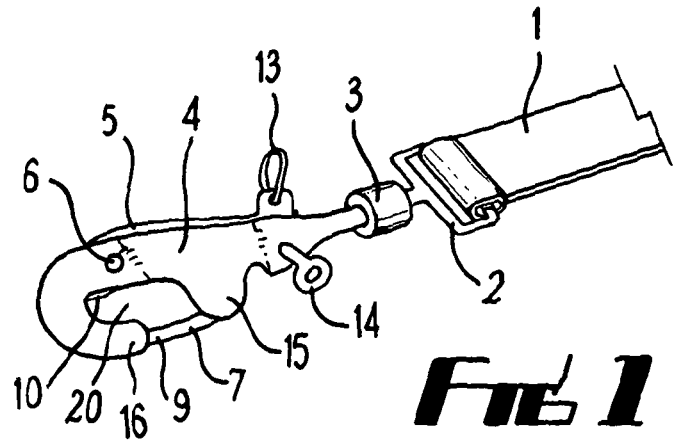
FIG. 1 shows a schematic perspective view of a first embodiment of the distal part of a lead according to the first aspect of the invention, with the release frame 5 in the closed configuration, the locking arrangement in the locked configuration and the gate 7 in the first position.

In FIG. 1, the distal end of a lead according to the first embodiment of the invention is shown. In this embodiment the elongate flexible elongate flexible member is a strap 1 attached by a connector 2 through a swivel joint 3 to a hooked body 4. The hooked body 4 forms an aperture 20 surrounded the hooked body and first terminal 15 and second terminal 16. A release frame 5 is pivotally mounted to the hooked body 4 by axle 6. A gate 7 has its proximal end pivotally mounted to the release frame 5 at a second axle 8. The gate has a free distal end 9. The gate 7 is biased towards its first position, the position shown in the Figures by a spring (not shown) biasing the gate 7 towards this first position with a stop (not shown) preventing it from moving past this first position relative to release frame 5. The gate 7 may be urged against the biasing of the spring to move it pivotally about axle 8 so that distal end 9 may be moved towards the body of release frame 5. Holes 11, 12 are provided in release frame 5 and hooked body 4 respectively, and when the release frame 5 is in the closed configuration, as shown in FIG. 1, a locking pin 14 is arranged to pass through holes 11, 12 in order to hold the release frame 5 and hooked body 4 locked together in the closed configuration.

Figure 3:
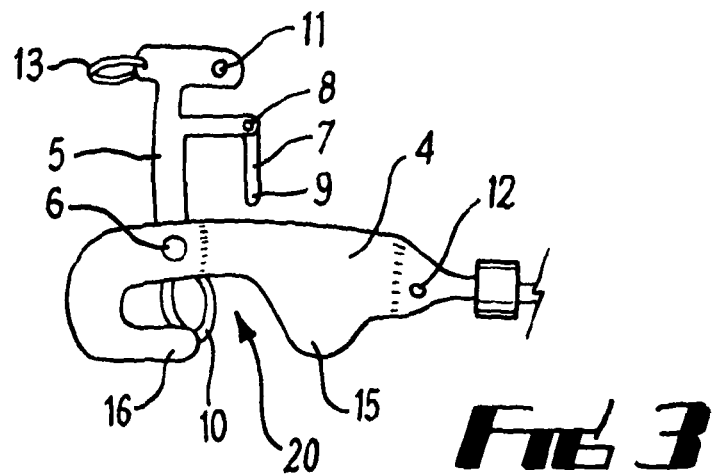
FIG. 3 shows a side elevation view of the hooked clip of the first embodiment, with the locking pin 14 disengaged and so that the locking arrangement is in the unlocked configuration and the release frame is in the open configuration.

A lanyard 13 passes through a hole in the release frame 5 and may be gripped and pulled by a handler in order to move the release frame 5 from its closed configuration, as shown in FIG. 1 to its open configuration, as shown in FIG. 3, once the pin 14 has been removed to unlock the arrangement.

The release frame 5 has a decoupling member 10 arranged to sweep across the aperture 20 as the release frame 5 is moved from the closed to the open configuration by rotation about axle 6.

A biasing means (not shown) urges the release frame 5 towards the closed configuration as shown in FIG. 1. Hence, if the release frame as shown in FIG. 3 were not held in place, for instance by the handler, the release frame 5 would be returned to the arrangement shown in FIG. 1 by rotation about axle 6 because of the action of the biasing means (not shown).

In order to attach the hooked body 4 to a fastening loop of a collar or a harness, the attachments means is employed in the arrangement shown in FIG. 1 either with or without the locking pin 14 present holding the release frame 5 in the closed configuration. In the description that follows, it is assumed that the locking pin 14 is in place holding the release frame 5 locked in its closed configuration relative to hooked body 4. In order to engage the hooked body 4 with a fastening loop, the gate 7 is pressed with its distal end 9 against the rim of the fastening loop. This urges the distal end of the gate 7 inwards into the aperture 20 against the biasing means (not shown) and allowing the gate 7 to pivot around axle 8. The gap between second terminal 16 and first terminal 15 is thus opened allowing the fastening loop to enter into aperture 20 past second terminal 16. Once the fastening loop has passed the distal end 9 of gate 7 through the gap between the distal end 9 and second terminal 16, the biasing means (not shown) causes the gate 7 to spring back into its first position, closing the gap and holding the rim of the fastening loop interlocked with the hooked body 4 inside of the aperture 20. Once the rim of the fastening loop is interlocked inside aperture 20 in this manner, it cannot be inadvertently released as the gate 7 is configured to only move inwards towards the release frame 5 and hooked body 4, towards its second position, and not to move outwards past the first position. In order to permit the fastening loop to be removed from aperture 20, it would be necessary to manually press the distal end 9 of gate 7 into the aperture 20 in order to form a gap to allow the fastening loop to be removed. This would be the case when the attachment means is in the locked configuration with the locking pin 14 passing through holes 11 and 12 holding the release frame 5 in its closed configuration relative to the hooked body 4.

Figure 2:
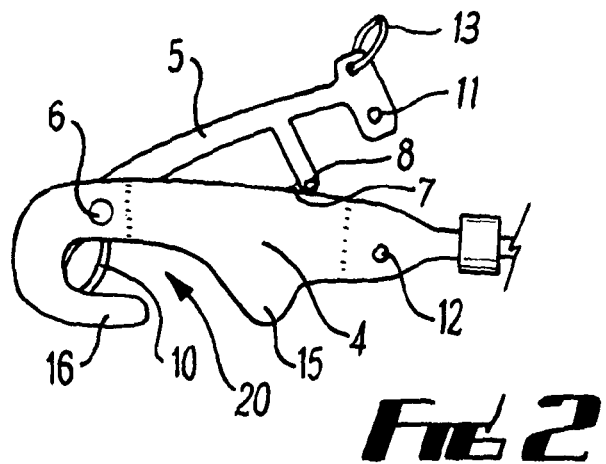
FIG. 2 shows a side elevation view of the attachment means of the first embodiment, with the locking pin 14 disengaged so that the locking arrangement is in the unlocked configuration and the release frame 5 is located part-way between closed and open configurations.

FIGS. 2 and 3 show how the apparatus of the invention may be used to disengage a fastening loop from hooked body 4 without the need to manipulate gate 7, even whilst the lead is under tension. FIG. 2 shows the release frame 5 part-way between its closed and open configurations and in FIG. 3 the release frame is shown in the open configuration. As the release frame 5 moves from the closed to the open configuration, the gate 7, rotatably attached to the frame at axle 8 and biased towards its first position, is retracted from the gap between the first terminal 15 and second terminal 16. This opens the aperture 20 so that any fastening loop may, in theory, be pulled out of the aperture 20 and removed from the hooked body 4. However, when the lead is under tension, any fastening loop will still be held within the hook formed by second terminal 16 and hooked body 4. This is clear from FIG. 2. However, as the release frame 5 is moved from a partially open configuration to the open configuration as shown in FIG. 3, the decoupling member 10 which forms part of the release frame 5 sweeps across the distal part of aperture 20 and will urge the rim of any fastening loop within aperture 20 over the end of second terminal 16 to allow the fastening loop to disengage from aperture 20 and hooked body 4, even when the lead is under tension.

Once the attachment means has been disengaged from the animal collar or harness in the manner described above, the release frame 5 can be allowed to rotate about axle 6 to the closed position (as shown in FIG. 1) and is urged to do, once released, by the biasing means arranged to urge rotation of the release frame 5 from its open position towards the closed position about axle 6. Once the release frame 5 has returned to the closed position, the handler may replace locking pin 14 into aligned holed 11, 12 to lock the release frame 5 in the closed configuration relative to hooked body 4 with gate 7 once again in its first position closing the gap between first terminal 15 and second terminal 16.

It will be appreciated that numerous modifications to the above described embodiment may be made without departing from the scope of the invention as defined in the appended claims. For example, the locking arrangement may employ a bolt and wing-nut arrangement, rather than a pin, passing through holes in the hooked body and release frame to provide the locked configuration. For instance, instead of the release frame being actuated by pulling on lanyard 13, this may be connected, through a pulley or lever arrangement, to a first trigger at the proximal end of the lead, whereby the release frame may be moved into the open position to unleash the animal by pulling the first trigger.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. An animal lead comprising an elongate flexible member arranged for gripping by a handler at a proximal end, and comprising a hooked body, gate and release frame for releasable attachment to a collar or harness at a distal end,
wherein:
the hooked body defines an aperture partially enclosed by the hooked body, the aperture having a gap between first and second terminals of the hooked body closable by the gate, and
the gate is operably mounted to the release frame,
the release frame being mounted to the hooked body for relative movement thereto and having an open configuration in which the gate is retracted from the gap, with the release frame, to leave the gap open, and a closed configuration in which the gate is held in a first position, by the release frame, to close the gap with a proximal end of the gate at the first terminal of the hooked body and a distal end of the gate at the second terminal of the hooked body, wherein the release frame is biased in the closed configuration, and
wherein the gate is urgeable, relative to the release frame when held in its closed configuration, towards a second position, wherein in the second position, the distal end of the gate is positioned away from the second terminal of the hooked body and into the aperture towards the hooked body whereby the second terminal of the hooked body may be clipped into a fastening loop of a collar or harness and whereby the hooked body is retainable in said fastening loop by the gate being released to its first position to close the gap,
the release frame further comprising a decoupling member arranged to sweep across the aperture, from a hooked curl of the hooked body towards the gap, as the release frame is moved from the closed to the open configuration, whereby the decoupling member urges said fastening loop to disengage from the aperture by sweeping a rim of said fastening loop out of the aperture past the second terminal through the gap.

2. An animal lead according to claim 1 wherein the gate is pivotally mounted to the release frame at its proximal end to be pivotable between the first and second positions, and wherein the gate is biased towards the first position.

3. An animal lead according to claim 1 wherein the release frame is pivotably mounted to the mounted body to be pivotable between the open configuration and the closed configuration and the release frame is biased towards the closed configuration.

4. An animal lead according to claim 1 further comprising a releasable locking arrangement having a locked configuration in which the release frame is held in the closed configuration and an unlocked configuration in which the release flame is movable between the closed and open configurations.

5. An animal lead according to claim 4 wherein the locking arrangement comprises a locking pin arranged to pass through openings in the release frame and hooked body in the locked configuration to hold the release frame in the closed configuration, and wherein the pin is removable to provide the unlocked configuration.

6. An animal lead according to claim 4 wherein the releasable locking arrangement comprises a pin which passes through the hooked body and the release frame when in the locked configuration, and which is removed from the hooked body and the release frame when in the unlocked configuration.

7. An animal lead according to claim 1 comprising a lanyard arranged to move the release frame from the closed to the open configuration when actuated.

8. An animal lead according to claim 1 wherein the hooked body is connected to the elongate member at a swivel joint arranged to allow rotation of the hooked body about the long axis of the elongate flexible member.

9. An animal lead according to claim 8 wherein the swivel joint is a universal joint.

10. An animal lead comprising an elongate flexible member arranged for gripping by it handler at a proximal end, and comprising a hooked body, gate and release frame for releasable attachment to a collar or harness at a distal end, wherein:
the hooked body defines an aperture partially enclosed by the hooked body, the aperture having a gap between first and second terminals of the hooked body closable by the gate, and
the gate is operably mounted to the release frame,
the release frame being mounted to the hooked body for relative movement thereto and having an open configuration in Which the gate is retracted from the gap, with the release frame, to leave the gap open, and a closed configuration in which the gate is held in a first position, by the release frame, to close the gap with a proximal end of the gate at the first terminal of the hooked body and a distal end of the gate at the second terminal of the hooked body, wherein the release frame is biased to the closed configuration, and
wherein the gate is urgeable, relative to the release frame when held in its closed configuration, towards a second position, wherein in the second position, the distal end of the gate is positioned away from the second terminal of the hooked body and into the aperture towards the hooked body whereby the second terminal of the hooked body may be clipped into a fastening loop of a collar or harness and whereby the hooked body is retainable in said fastening loop by the gate being released to its first position to close the gap,
the release frame further comprising a decoupling member arranged to sweep across the aperture, from a hooked end of the hooked body towards the gap, as the release frame is moved from the closed to the open configuration, whereby the decoupling member urges said fastening loop to disengage from said hooked body by sweeping said fastening loop toward the gap and over the end of the second terminal.

11. An animal lead according to claim 10, wherein said decoupling member is arranged to have an end adjacent the second terminal when the release frame is in the open position.

12. An animal lead according to claim 10, wherein said decoupling member is arranged at a distal end of said release frame.

13. An animal lead according to claim 10, wherein said decoupling member and said gate are arranged at opposing ends of said release frame.

14. An animal lead according to claim 10, wherein said hooked body is hollow whereby the release frame, in its closed configuration, is substantially concealed within the interior of the hooked body.

15. An animal lead according to claim 10, comprising a releasable locking arrangement having a locked configuration in which the release frame is held in the closed configuration, wherein the gate is pivotally mounted to the release frame, and wherein in the locked configuration the gate is urgable to open sufficiently to allow the fastening loop into the aperture.

16. An animal lead comprising an elongate flexible member arranged for gripping by a handler at a proximal end, and comprising a hooked body, gate and release frame for releasable attachment to a collar or harness at a distal end, wherein:

the hooked body defines an aperture partially enclosed by the hooted body, the aperture having a gap between first and second terminals of the hooked body closable by the gate, and the gate is operably mounted to the release frame, the release frame being mounted to the hooked body for relative movement thereto and having an open configuration in which the gate is retracted from the gap, with the release frame, to leave the gap open, and a closed configuration in which the gate is held in a first position, by the release frame, to close the gap with a proximal end of the gate at the first terminal of the hooked body and a distal end of the gate at the second terminal of the hooked body, wherein the release frame is biased to the closed configuration, wherein said hooked body is hollow whereby the release frame, in its closed configuration, is substantially concealed within the interior of the hooked body, and wherein the gate is urgeable, relative to the release frame when held in its closed configuration, towards a second position, wherein in the second position, the distal end of the gate is positioned away from the second terminal of the hooked body and into the aperture towards the hooked body whereby the second terminal of the hooked body may be clipped into a fastening loop of a collar or harness and whereby the hooked body is retainable in said fastening loop by the gate being released to its first position to close the gap, the release frame further comprising a decoupling member arranged at an opposing end of said release frame from said gate, wherein said release flame is arranged to sweep across the aperture, from a hooked end of the hooked body towards the gap, as the release frame is moved from the closed, to the open configuration, whereby the decoupling member urges said fastening loop to disengage from said hooked body by sweeping said fastening loop toward the gap and over the end of the second terminal.

17. An animal lead according to claim 16, comprising a releasable locking arrangement having a locked configuration in which the release frame is held in the closed configuration, wherein the gate is pivotally mounted to the release frame, and wherein in the locked configuration the gate is urgable to open sufficiently to allow the fastening loop into the aperture.

\* \* \* \* \*